(12) United States Patent
Dee et al.

(10) Patent No.: US 12,252,232 B2
(45) Date of Patent: Mar. 18, 2025

(54) CONTROL SYSTEM AND METHOD

(71) Applicant: BAE SYSTEMS plc, London (GB)

(72) Inventors: Justin Mark Dee, Rochester (GB); Peter Stuart Maley, Rochester (GB)

(73) Assignee: BAE SYSTEMS PLC, London (GB)

( * ) Notice: Subject to any disclaimer, the term of this patent is extended or adjusted under 35 U.S.C. 154(b) by 11 days.

(21) Appl. No.: 18/001,129

(22) PCT Filed: Jun. 4, 2021

(86) PCT No.: PCT/GB2021/051385
§ 371 (c)(1),
(2) Date: Dec. 8, 2022

(87) PCT Pub. No.: WO2021/250378
PCT Pub. Date: Dec. 16, 2021

(65) Prior Publication Data
US 2023/0211871 A1 Jul. 6, 2023

(30) Foreign Application Priority Data
Jun. 11, 2020 (EP) ..................................... 20275108
Jun. 11, 2020 (GB) ..................................... 2008875

(51) Int. Cl.
*B64C 13/50* (2006.01)
*B64C 13/04* (2006.01)
(Continued)

(52) U.S. Cl.
CPC ............ *B64C 13/10* (2013.01); *B64C 13/042* (2018.01); *B64C 13/506* (2018.01);
(Continued)

(58) Field of Classification Search
CPC ....... B64C 13/10; B64C 13/042; B64C 13/50; B64C 13/503; B64C 13/504; B64C 13/505; B64C 13/506; B64C 13/507; G05G 5/03
See application file for complete search history.

(56) References Cited

U.S. PATENT DOCUMENTS 8,386,092 B1 * 2/2013 Carrico .................. B64D 45/00
340/972
9,340,278 B2 * 5/2016 Hagerott ............... B64C 13/345
(Continued)

FOREIGN PATENT DOCUMENTS

EP 0483773 A1 5/1992
EP 2937283 A1 10/2015
(Continued)

OTHER PUBLICATIONS

International Search Report and Written Opinion received for PCT/GB2021/051385. Mail date: Aug. 26, 2021. 15 pages.
(Continued)

*Primary Examiner* — Brian M O'Hara
(74) *Attorney, Agent, or Firm* — Finch & Maloney PLLC

(57) ABSTRACT

A control system for assisting a pilot to control an aircraft operating under control of an active inceptor, the control system comprising: a receiver for receiving pilot-inputs on an active inceptor, an instruction generator to generate an instruction, the instruction based on an external signal associated with the geographical location of the aircraft; a tactile cue generator to generates a tactile cue which causes the active inceptor to move from a nominal position to a first offset position within a predetermined time period in response to the instruction.

18 Claims, 11 Drawing Sheets

(51) Int. Cl.
 *B64C 13/10* (2006.01)
 *G05G 5/03* (2008.04)
 *G05G 9/047* (2006.01)

(52) U.S. Cl.
 CPC ............ *B64C 13/507* (2018.01); *G05G 5/03* (2013.01); *G05G 2009/04766* (2013.01)

(56) References Cited

U.S. PATENT DOCUMENTS

| | | | | |
|---|---|---|---|---|
| 9,734,726 | B2* | 8/2017 | Enns | G08G 5/025 |
| 10,054,957 | B2* | 8/2018 | Cherepinsky | B64C 13/10 |
| 11,820,491 | B2* | 11/2023 | Queiras | B64C 13/18 |
| 2003/0226937 | A1 | 12/2003 | Einthoven et al. | |
| 2007/0235594 | A1* | 10/2007 | Wingett | B64C 13/02 |
| | | | | 244/223 |
| 2010/0181431 | A1 | 7/2010 | Ishiba | |
| 2015/0235560 | A1 | 8/2015 | Enns et al. | |

FOREIGN PATENT DOCUMENTS

| | | |
|---|---|---|
| EP | 3069990 A1 | 9/2016 |
| FR | 2875787 A1 | 3/2006 |
| GB | 2549270 A | 10/2017 |
| GB | 2569851 A | 7/2019 |
| WO | 2016048713 A1 | 3/2016 |
| WO | 2021250378 A1 | 12/2021 |

OTHER PUBLICATIONS

Combined Search and Examination Report under Sections 17 and 18(3) received for GB App. No. 2008875.3, dated Dec. 10, 2020. 8 pages.

Extended European Search Report received for EP App. No. 20275108.7, dated Nov. 24, 2020. 9 pages.

* cited by examiner

CONTROL SYSTEM AND METHOD

BACKGROUND

The present invention relates to methods and system for assisting a pilot to control an aircraft operating under control of an active inceptor via a control system.

Vehicles, and specifically aircraft, have many control systems that are utilised to convey operator instructions to vehicle control systems. In aircraft, flight controls are one set of control systems which enable the operator to control aspects of the aircraft during movement in the air or whilst on the ground.

In aircraft, inceptors are the controls that pilots use to manoeuvre the aircraft. Commonly referred to as "sticks," inceptors cover a variety of pilot controls on fixed- and rotary-wing platforms including side sticks, centre sticks, throttles, cyclics, and collectives. Typically, in aircraft, pitch and roll are controlled by a stick or yoke (inceptors) operated by an operator. One example of an inceptor is a side-stick positioned at one side of the operator. The side-stick typically has two dimensions of movement, e.g. forwards/backwards, left/right, one for each of the pitch and roll whilst the yaw of an aircraft is controlled using rudder pedals by the operator's feet.

Whilst on the ground, aircraft are controlled using nose-wheel steering and wheel brakes. Nose-wheel steering is typically controlled using a tiller control, and brakes are controlled either by distinct pedals, or by pressing brake regions of the rudder pedal.

Passive inceptors are traditionally connected to directional aircraft surfaces and power controls through mechanical linkages. On fly-by-wire aircraft, the passive inceptors transmit pilot inputs to the flight control computers, which translates them to commands that adjust directional surfaces and power. Unlike passive controls, active inceptors provide intuitive tactile feedback that helps pilots control the aircraft and maintain a stable flight. The traditional passive systems cannot affect the feel of the "stick" in real time so changes to the flight envelope of the aircraft cannot be bed back to the pilot as cues. This is due to the use of mechanical inceptors and may lead to no situational awareness through the inceptor feel, such as excessive bank angle or stall.

Active inceptor systems feed information from the aircraft's fly-by-wire system to the pilot through the inceptor. The force feedback provided directly into the pilot's hands informs the pilot of impending flight envelope limits, or mode engagements, improving the pilot's awareness and ability to control the aircraft. The active inceptor system provides an intuitive means of giving immediate feedback to the pilot and may link the controls across the aircraft cockpit, so each pilot can feel the forces and see the displacements the other is causing. As each pilot/operator is linked to the other electrically in the active inceptor system, this removes all the complexity, weight and volume associated to the mechanically linked passive inceptor systems resulting in increased safety and crew coordination in dual operator situations.

In many situations a pilot is bombarded with stimuli from many sources. This can quickly lead to the pilot having more information that they can handle at a specific time. This can lead to errors. Active inceptors can help mitigate some of these errors. However, this is not always the case and help provided by the active inceptor may produce more problems than solutions. It is thus important to establish accurately for different situations the type and nature of aid provided by the active inceptor.

Accordingly, one object of the present invention is to provide an improved control system in communication with an active inceptor.

According to another object the present invention is seeking to overcome at least some of the problems associated with known systems.

SUMMARY

According to one aspect of the present invention, a method for assisting a pilot to control an aircraft operating under control of an active inceptor via a control system, the method comprising: receiving, from the pilot, an input on the active inceptor wherein the active inceptor is in a nominal position; receiving an instruction from the control system based on an external signal associated with a geographical location of the aircraft; and outputting, in response the received instruction, a tactile cue which causes the active inceptor to move from the nominal position to a first offset position within a predetermined period of time.

Preferably, the tactile cue comprises a corresponding tactile force, and outputting comprises summing the corresponding tactile force with the input received from the pilot. Preferably, outputting further comprises: mapping an estimated rise time of a force simulation associated with the active inceptor to a compensation gain value, based on a look-up table; and applying the compensation gain value to the tactile force, based on the look-up table. Preferably, the force simulation is a mass-spring-damper model. Preferably, the look-up table is a 2D look-up table. Preferably, further comprising a subsequent tactile cue which causes the active inceptor to move to a second offset position subsequent to the first offset position. Preferably, the second offset position of the active inceptor is the same as the nominal position of the active inceptor. Preferably, outputting the subsequent tactile cue cannot be delivered until the tactile cue is over. Preferably, the predetermined period of time over which the tactile cue causes the active inceptor to move from the nominal position to the first offset position is between 0.1 and 2 seconds. Preferably, the instruction is any one of a directional indicator, speed indicator, a throttle indictor, a distance to turn indicator, a traffic indicator, an impending limit indicator or a time indicator.

According to another aspect of the present invention, a control system for assisting a pilot to control an aircraft operating under control of an active inceptor, the control system comprising: a receiver for receiving pilot-inputs on an active inceptor; an instruction generator to generate an instruction, the instruction based on an external signal associated with the geographical location of the aircraft; and a tactile cue generator to generate a tactile cue which causes the active inceptor to move from a nominal position to a first offset position in a predetermined time period in response to the instruction.

Preferably, the tactile cue comprises a corresponding tactile force, and the tactile cue generator further comprises summing the tactile force with the pilot-input. Preferably, the tactile cue generator further comprises: a look-up table comprising an estimated rise time of a force simulator with the active inceptor, said look-up table for mapping the estimated rise time to a compensation gain value; and wherein the compensation gain value applied to the tactile force is based on the look-up table. Preferably, the tactile cue generator is configured to generate a subsequent tactile cue which causes the active inceptor to move to a second offset position subsequent to the first offset position. Preferably, the second offset position of the active inceptor is the same as the nominal position of the active inceptor. Preferably, the subsequent tactile cue cannot be generated until the tactile cue is over. Preferably, the predetermined period of time over which the tactile cue causes the active inceptor to move from the nominal position to the first offset position is between 0.1 and 2 seconds. Preferably, the instruction is any one of a directional indicator, speed indicator, a throttle indictor, a distance to turn indicator, a traffic indicator, an impending limit indicator or a time indicator. Preferably, a tactile cue generator for use in the control system, said tactile cue generator comprising: an operator force input system to receive an operator force; a first integrator to integrate an acceleration associated with operator force resulting in a velocity; a second integrator to integrate the velocity resulting in a position; a damping force based on the velocity; a gradient force based on the position; and an inertia characteristic, in combination with the damping force and gradient force, used to calculate the position offset when generating the tactile cue, wherein the position offset is the difference between the nominal position and the first offset position.

DESCRIPTION OF THE DRAWINGS

Reference will now be made, by way of example, to the accompanying drawings, in which.

DESCRIPTION OF THE INVENTION

In general, the present invention relates to methods and systems for controlling an aircraft.

When taxiing an aircraft at an airfield, the operator(s) are required to be aware of the route they need to take. Often, this route is sent by air traffic control to ensure that the aircraft avoids any hazards and to comply with the operation of the airport. However, for a multitude of reasons including complex runways and/or taxiway geometry, the operator(s) (e.g. pilot(s)) may become confused leading to an increased risk of errors occurring which ultimately results in an increased safety risk of passengers of the aircraft and an increase in the time taken to safely taxi the aircraft. Due to the limited view from the cockpit of an aircraft, pilots may also have poor spatial awareness, and this is only exacerbated during adverse weather conditions such as rain, snow and fog. Additionally, due to economic demands put upon airports, the throughput is leading to far busier airfields.

In this disclosure, methods and systems have been identified that may reduce the workload of the operator(s), and therefore improve efficiency and safety. These methods and systems may result in enabling a higher throughput of aircraft in airports.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

Figure 1:
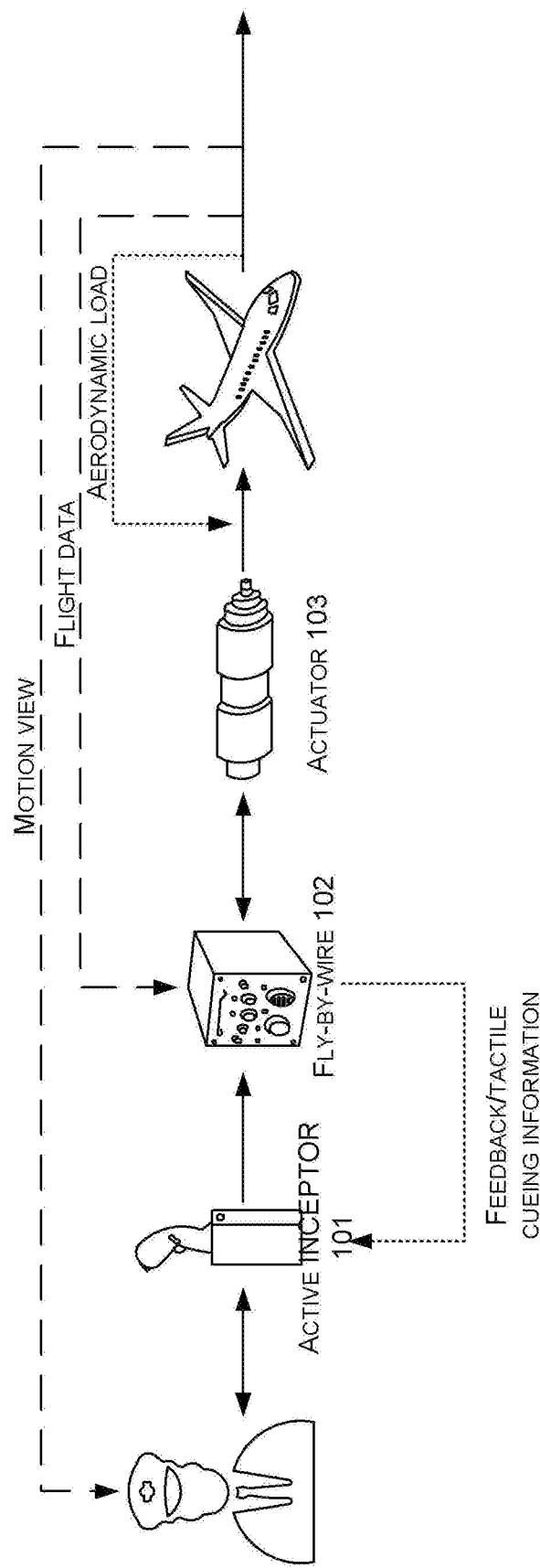
FIG. 1 is a schematic of a typical active inceptor system.

Inceptors are a type of input device that pilots use to direct and manoeuvre the aircraft. They are flight critical. Commonly referred to as "sticks," inceptors cover a variety of pilot controls on fixed- and rotary-wing platforms including side sticks, centre sticks, throttles, cyclics, and collectives. Inceptors traditionally are connected to directional aircraft surfaces and power controls through mechanical linkages. On fly-by-wire aircraft, the inceptors transmit pilot inputs to a flight control computer, which translates them instantaneously to commands that adjust directional surfaces and power. Active inceptor systems feed information from an aircraft's fly-by-wire system 102 to the pilot through the active inceptor 101 (see FIG. 1). The fly-by-wire 102 communicates with an actuator which responds to the aerodynamic load of an aircraft, said aircraft communicates flight data to the fly-by-wire system 102. An active inceptor system feeds back information from the aircraft's fly-by-wire system 102 to the pilot through the inceptor 101.

Figure 2:
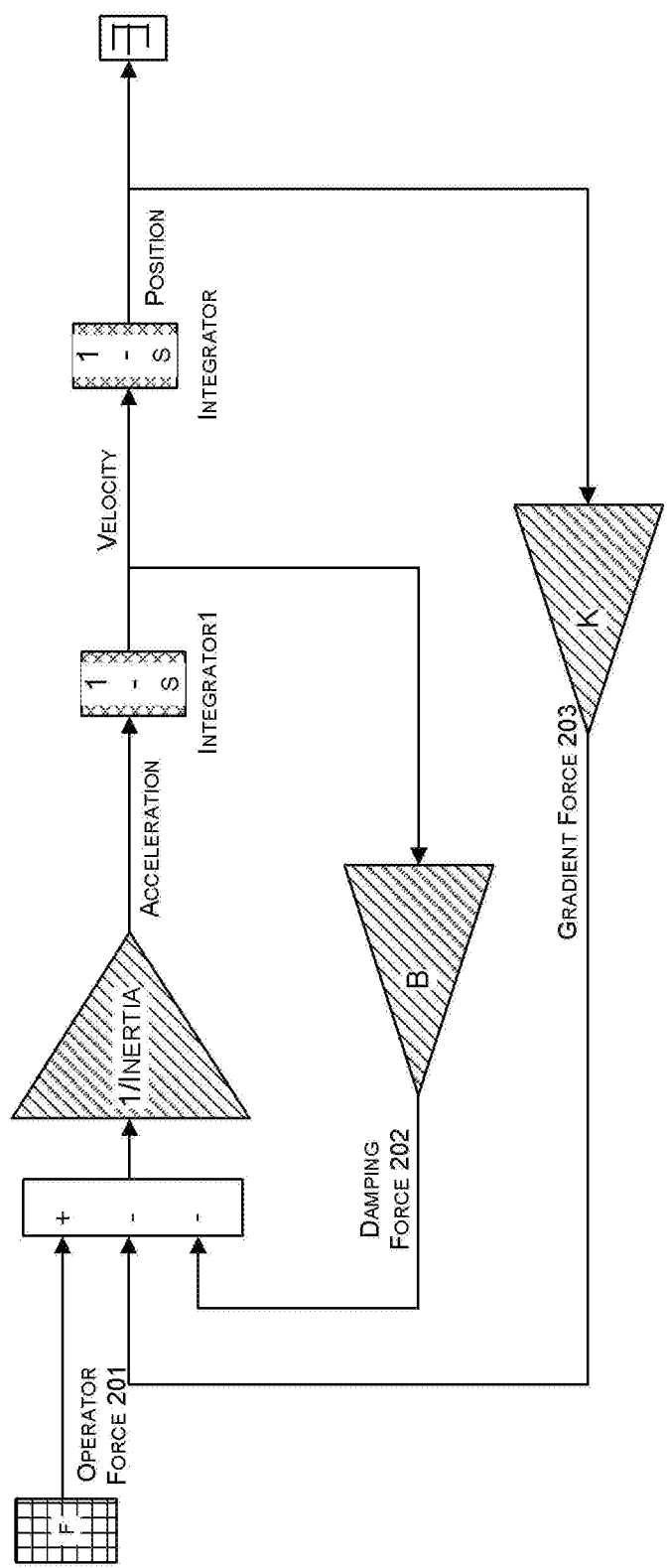
FIG. 2 is a block diagram showing how simulation model function parameters can be transmitted from a command computer in response to an operator-commanded position/force.

Unlike a steering & column system or a passive inceptor system, an active inceptor system provides tactile feedback to an operator through internally simulating a force, for example, a mass-spring-damper (MSD) system or any other feel model. An active inceptor in the form of an active stick offers an unrestricted view of displays compared to a steering & column system. The tactile feedback drives an actuated mechanism (including a stick, e.g. an inceptor) to mimic the dynamic performance of the mass-spring-damper system or other feel model in response to operator-applied forces. The simulation force functional parameters, e.g. MSD functional parameters, are typically transmitted from a command computer in response to the state of the vehicle (e.g. an aircraft). A typical simulated MSD model is shown in FIG. 2. The main parameters in FIG. 2 are the Operator Force 201 (e.g. the pilot force), the Inertia, m, the Damping force 202, and the gradient force 203 which can be transmitted from the command computer. The model shown in FIG. 2 allows tactile cues to be conveyed to an operator (e.g. a pilot) in the form of variable stops, ramps, and/or dynamic changes to the feel through the overlay of additional forces of position offsets. The model can be changed in real time based on parameters from a flight control computer of the like (not shown). One form of a tactile cue is a nudge which comprises a short stimulus to cause a movement of the stick in a specific direction for a specific length of time. This will be discussed in greater detail below.

An active inceptor system can provide tactile cueing (i.e. haptic cueing) features in "real time" to warn the operator of impending limits or to encourage the operator of an aircraft whilst taxiing or for other simple operations to move in a certain direction. This is especially useful to the operator as they need not look towards a navigation screen so as to reduce their workload and, thereby, increase the safety of the aircraft and passengers or crew.

In some cases, the control system comprises a tactile cue generator generates a tactile cue which causes the active inceptor to move from a nominal position to a first offset position within a predetermined time period in response to the instruction. This is also referred to as a nudge (i.e. a transient position injection) which acts on a user-input device (e.g. inceptor/stick) used by an operator (e.g. pilot). The nudge may be referred to as an "indicator".

In one example, such as for aircraft runway taxi operations, the nudge may be to either the left or right direction so that an operator (e.g. a pilot) can be encouraged to steer in a correct direction to follow a required taxiing path. However, it is possible to make use of the transient position injection to indicate movement about any of the pitch axis, yaw axis and/or roll axis of an aircraft whilst in flight. The nudge is output to the active inceptor in response to a processor input. For example, via a taxiing map to provide an indication to the operator of which direction the vehicle (e.g. aircraft) should be directed in order to taxi. Therefore, the operator need not take their eyes off the airfield or road which results in reduced chance of operator-error and increased safety of the operator, crew and passengers.

In some cases, the nudge is employed to indicate a wrong direction taken by the operator, e.g. if the operator is applying force to the active inceptor (stick) in a left direction but should be moving in the right direction, a right-direction nudge may be provided.

Figure 3:
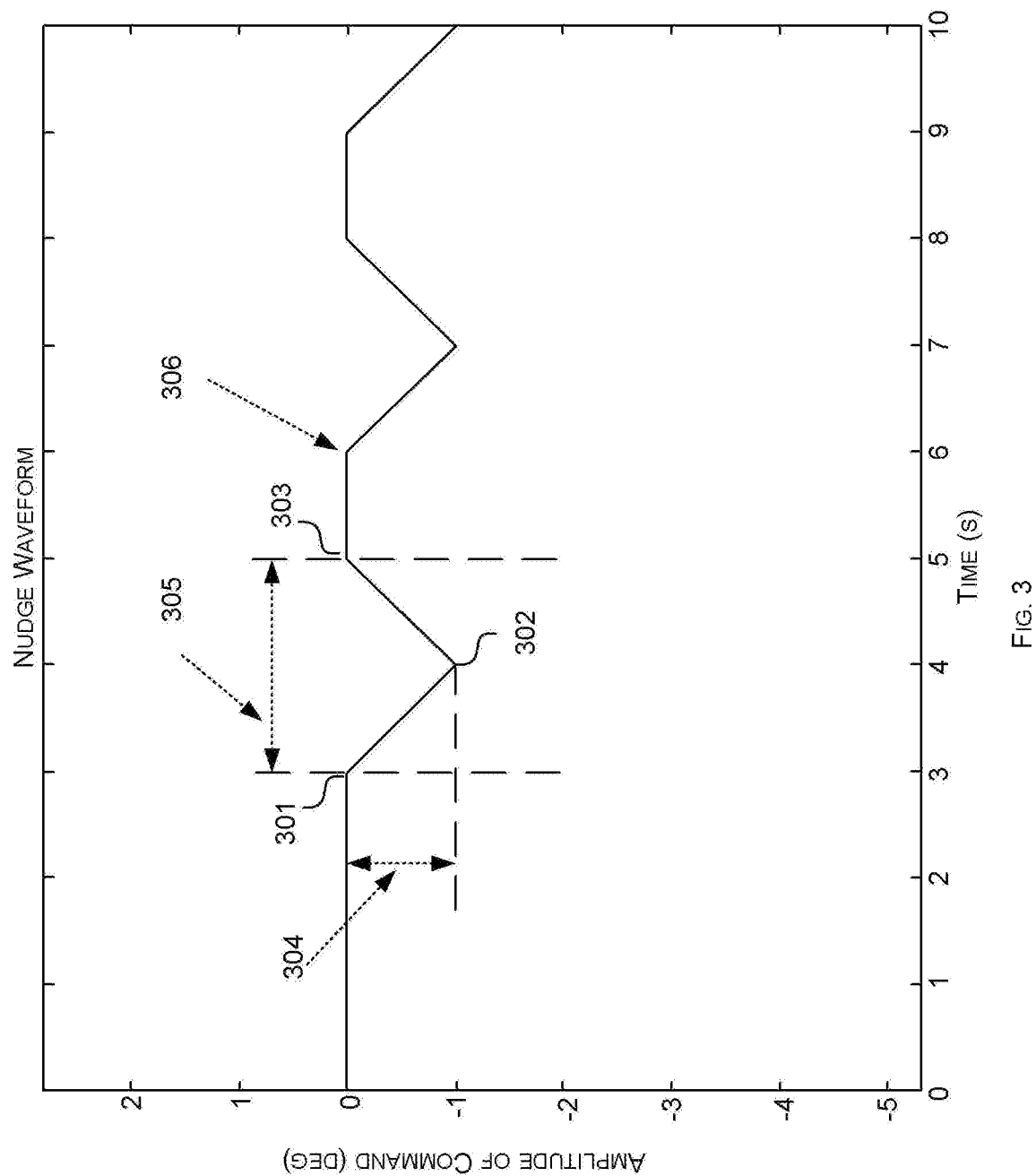
FIG. 3 is a graph of amplitude against time showing a series of negative nudge features.

The nudge (i.e. the indicator) may be defined to have three command parameters for each activation of said nudge. The first are activation bits (at least one for each direction), the second is the required amplitude of the nudge (how much position offset is required at the active inceptor), and the third is the required time period the nudge will operate over. In FIG. 3, one example of a nudge is shown in the graph in the form of a triangular waveform with a time period 305 and a waveform amplitude 304. The waveform amplitude 304 represents the position offset of the active inceptor from its current nominal position. Thus referring to the figure, it is clear when the y-axis is at zero, the active inceptor is at a nominal position 301, and when the y-axis at −1, the active inceptor has been caused to move to a first offset position 302 as a result of the tactile cue. In some cases, the tactile cue generator may further generate a second tactile cue to cause the active inceptor to move to a second offset position 303 (usually the same as the nominal position) to complete the nudge. It would be clear to a person skilled in the art of aircraft control systems that any waveform shape could be implemented, e.g. a square wave input, sinusoidal wave input, etc. The waveform amplitude 304 represents the position of the nudge, and the time period represents the duration of the nudge. Typically, the time period 305 over which the nudge is applied is between 0.01-2 seconds, preferably 0.5 seconds. In some cases, the time period is only the time period over which the active inceptor moves between the nominal position 301 and a first offset position 302. In FIG. 3, the nudges are shown as "negative" nudges in the sense that they produce a negative amplitude. A corresponding positive amplitude nudge may be indicative of a nudge in the opposite direction to the negative amplitude nudge. Different nudges indicating different scenarios (e.g. impending limits of the aircraft or indication of subsequent aircraft direction) can have different amplitudes, waveform shapes (e.g. square, sine, triangular, etc), and/or different time periods over which they operate so that the operator understands a particular nudge to be an indication of a particular instruction/scenario. A second nudge 306 may follow a first nudge.

When the operator is already applying force (i.e. providing an input) to the active inceptor in a particular direction, it is important to provide nudge offset so that the nudge is noticeable to an operator whilst the operator is applying directional force to the active inceptor (e.g. active stick). In this case, the nudge superimposes a tactile cue over the pilot-input position through use of force offset where the amplitude and frequency may be chosen to supply the required positional amplitude of transient movement. This is described in detail below.

In order to superimpose a tactile cue, a command may come in the form of a nudge offset summed to the current operator applied force. This is to prevent disturbance of the internal positional control loops. Therefore, the actual calculated nudge offset used within the active inceptor system derives a force offset from the current gradient in order to determine the correct level of input required in order to achieve the correct position amplitude. The gradient is given by: Gradient=$\Delta F/\Delta x$ where F is the force and x is the position. The required nudge offset command can be calculated by rearranging the equation in terms of the required position offset ($\Delta x$) and the gradient: $\Delta F$=Gradient.$\Delta x$.

In the above example the command is in the form of a triangular input with peak amplitude equivalent to the calculated change in force. $\Delta F$, therefore, the ability of the active inceptor system to meet the commanded input is limited by the bandwidth implied by the MSD parameters. This means that the achieved position of the active inceptor will lag the commanded position by a certain amount, depending on the current bandwidth. The bandwidth of the system may be calculated by the equation $\omega=\sqrt{(k/m)}$ where k is the current commanded gradient, m is the current commanded inertia, and w is the current measure of bandwidth (usually in units of radians per second).

Figure 4:
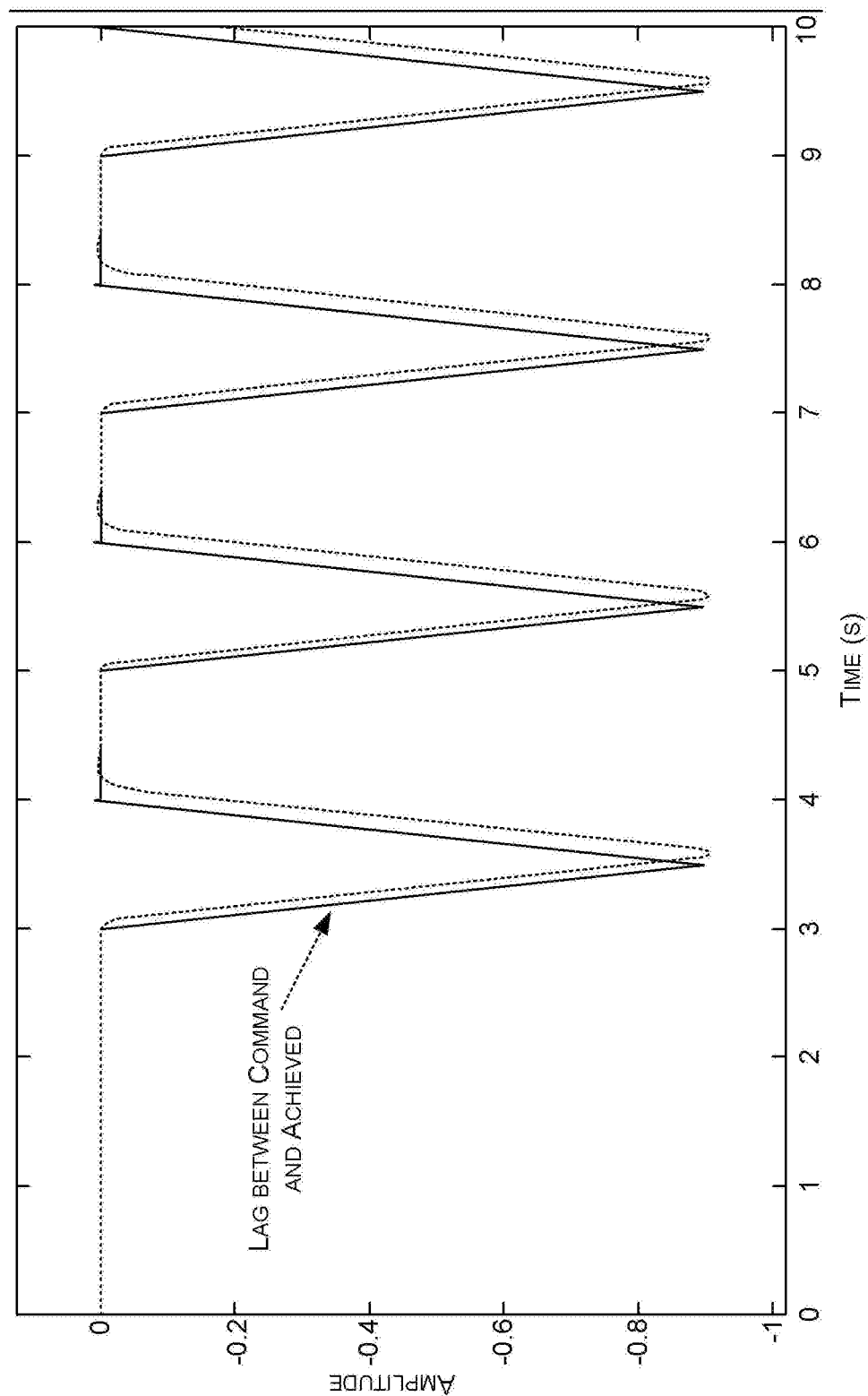
FIG. 4 is a graph of amplitude against time showing a lag in time between the command and the achieved waveform.

Based on the current value of w, the nudge response of the inceptor system will tend to lag the command signal as shown in FIG. 4. The command is shown as the solid line, and the achieved performance of the active inceptor is shown as the dotted line. The gap between the two lines in the time axis represents the response lag of the achieved nudge compared to the command. This gap depends on the speed of the command (i.e. the command bandwidth), and also the bandwidth of the active inceptor response.

Figure 5:
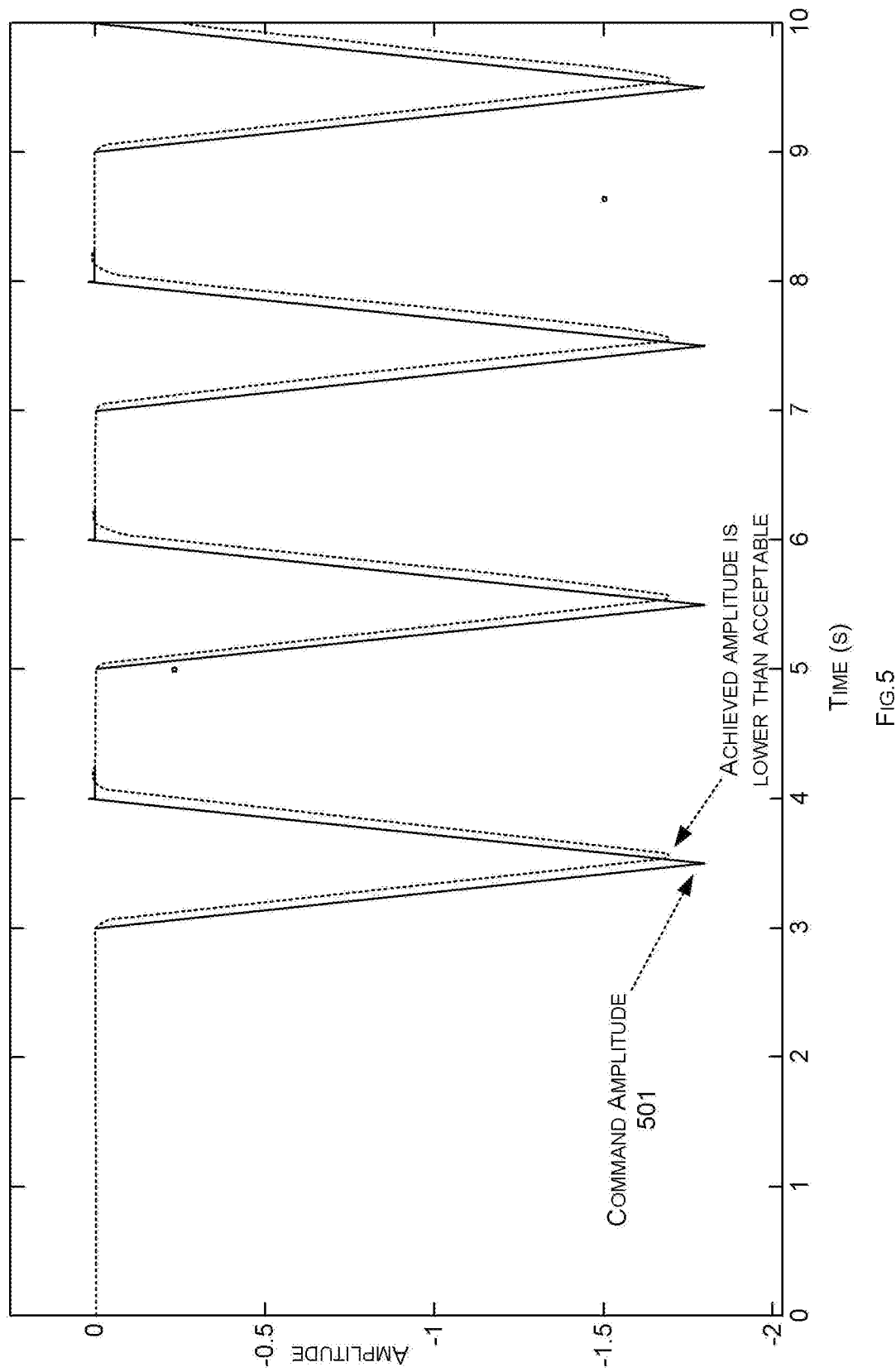
FIG. 5 is a graph of amplitude against time showing a shortfall in the achieved amplitude compared to the commanded amplitude.

FIG. 5 shows that in addition to a response lag in the nudge, the achieved amplitude also falls short of the commanded amplitude. The command amplitude is shown as the solid line, and the achieved amplitude is shown as the dotted line.

This shortfall in achieved amplitude and/or the lag response may be addressed. One way of doing so is by predicting the rise time for the nudge response, i.e. the rise time for a second order feel model. Predicting the rise time may depend on the bandwidth w of the system and/or the damping ratio of the force simulation (e.g. MSD model or any other feel model). The rise time also depends on the gradient, k, and the inertia, m. In order to address this problem, an algorithm of the active inceptor system may estimate the rise time of the second order feel model, and subsequently apply a compensation gain to the command in order to achieve the required positional amplitude. The force simulation (e.g. MSD/feel model) rise time is mapped from the command amplitude by an empirical calculation. Therefore, a look-up table, based on the empirical calculation, can be used to map the rise time (nudge response) to the compensation gain value. The look-up table may comprise an estimate of the rise time of the force simulation associated with the active inceptor.

In some cases, in order to minimise confusion to the operator, it may be preferable to provide logic associated with activation of the nudge such that once a nudge is underway, it cannot be reactivated until the current nudge has finished.

Figure 6A:
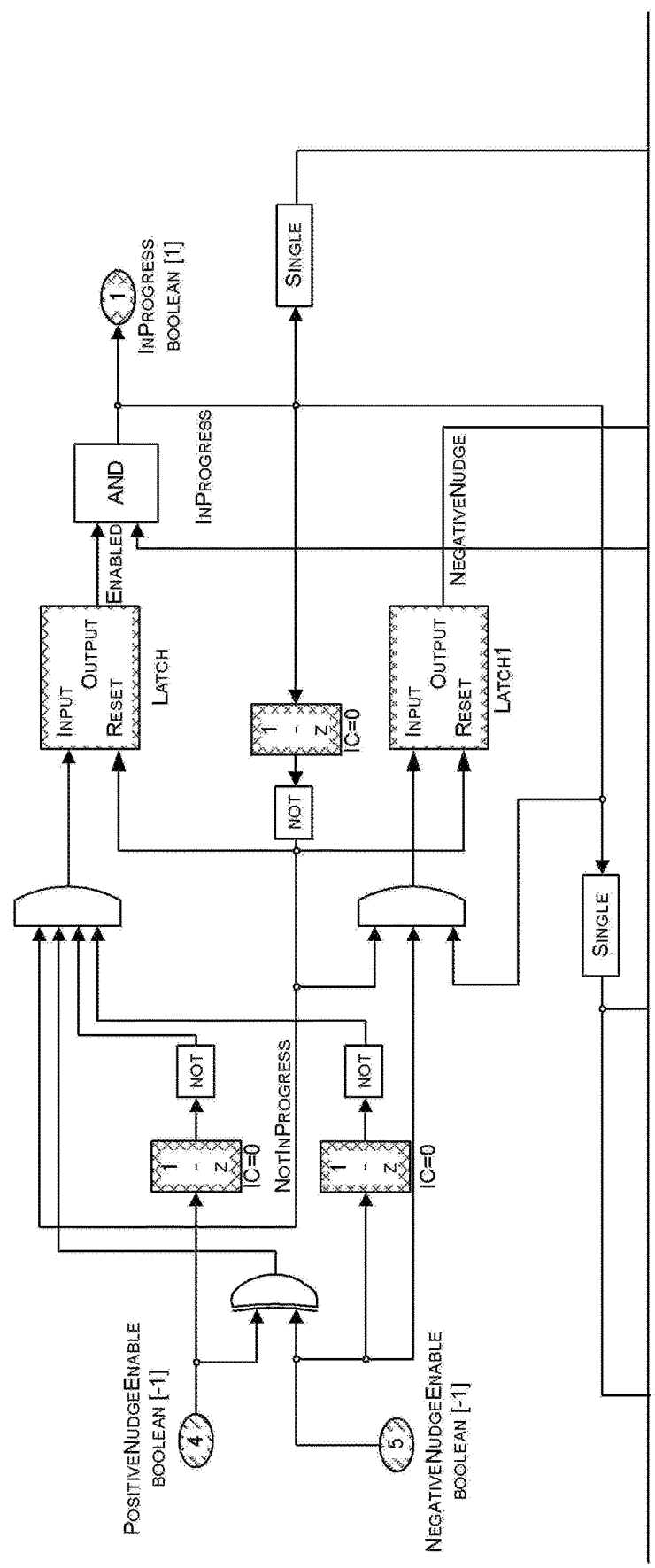
FIG. 6A-C is a block diagram showing an example of logic of the nudge feature.
Figure 6B:
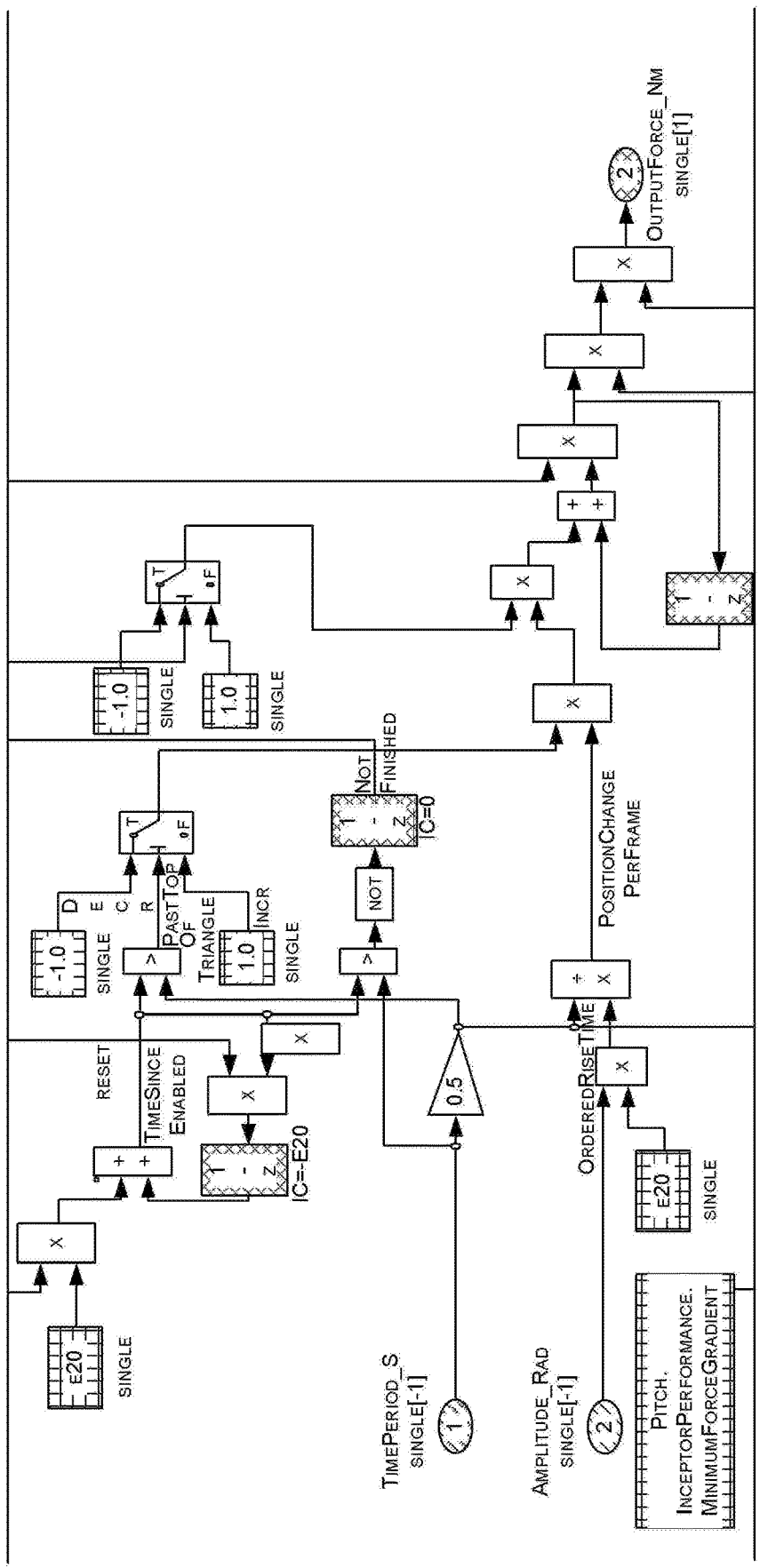
Figure 6C:
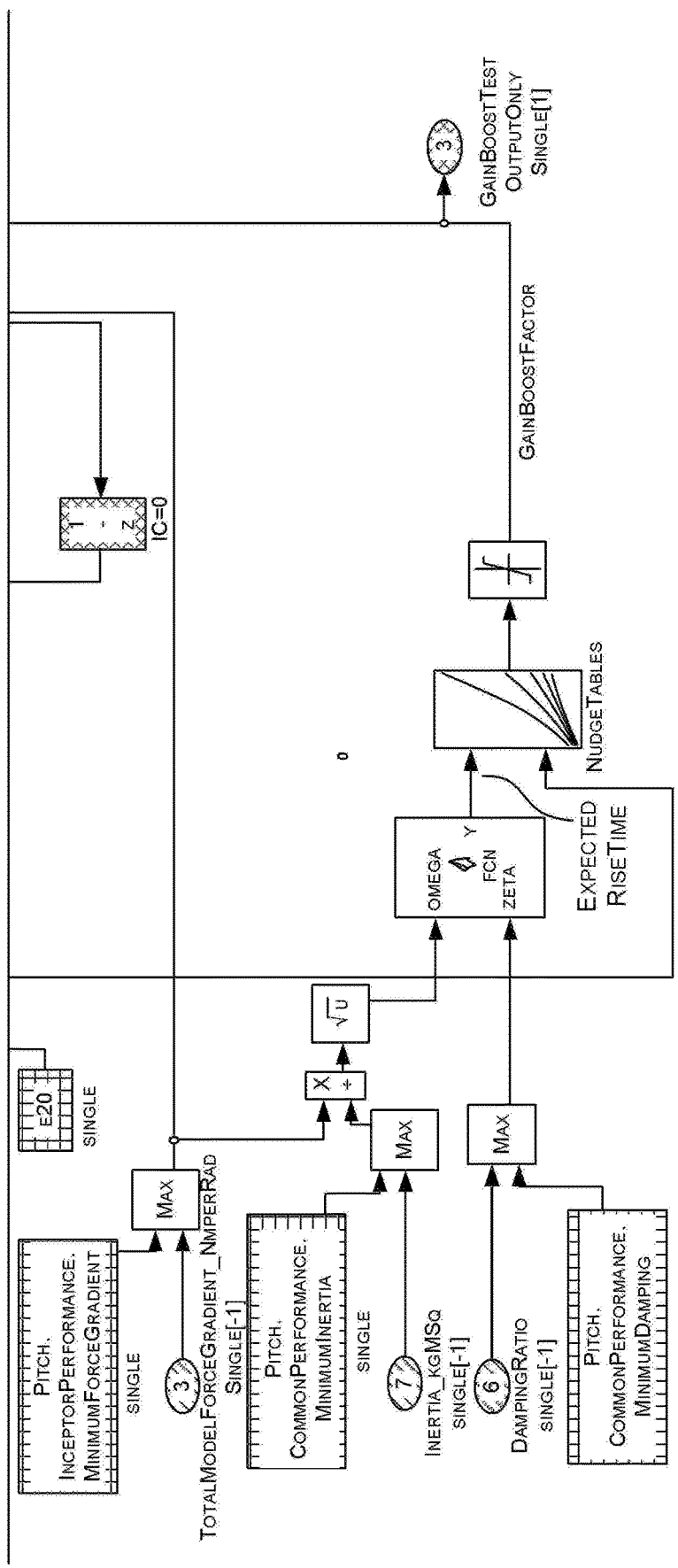

FIGS. 6A-C shows how the overall nudge algorithm operates in one example. Although FIGS. 6A-C are shown as interconnected, they may be operable as separate algorithms. FIG. 6A shows one example of the logic associated with activating the nudge (in either a positive or negative direction), and not allowing re-activation if a nudge is already in progress. As shown in FIG. 6A, reactivation of the nudge can be prevented by blocking further nudge commands until the time period associated with the last nudge command has elapsed. One of the nudge command parameters is the time period for the nudge, which allows the inceptor control system to know when the nudge command has finished. It can therefore block any further nudge initiations by the flight control computers until the current nudge has completed. FIG. 6B shows one example of the logic associated with generating a waveform (e.g. a triangle waveform) from the commanded time period and deriving the force output required to generate the correct position amplitude (which is based on the current gradient). FIG. 6C shows one example of the logic associated with generating the compensation gain to apply the force output based on the estimated rise time of the second order MSD/feel model, and the damping ratio commanded. The "NudgeTables" in FIG. 6C are look-up tables. In some examples, the look-up tables may be 2D look-up tables. The look-up tables may provide a range of gains that are interpolated to provide a variety of compensatory gains depending on the type of waveform of the nudge/indicator selected. For example, a square waveform would require a different set of compensation gains to a sinusoidal waveform.

Figure 7:
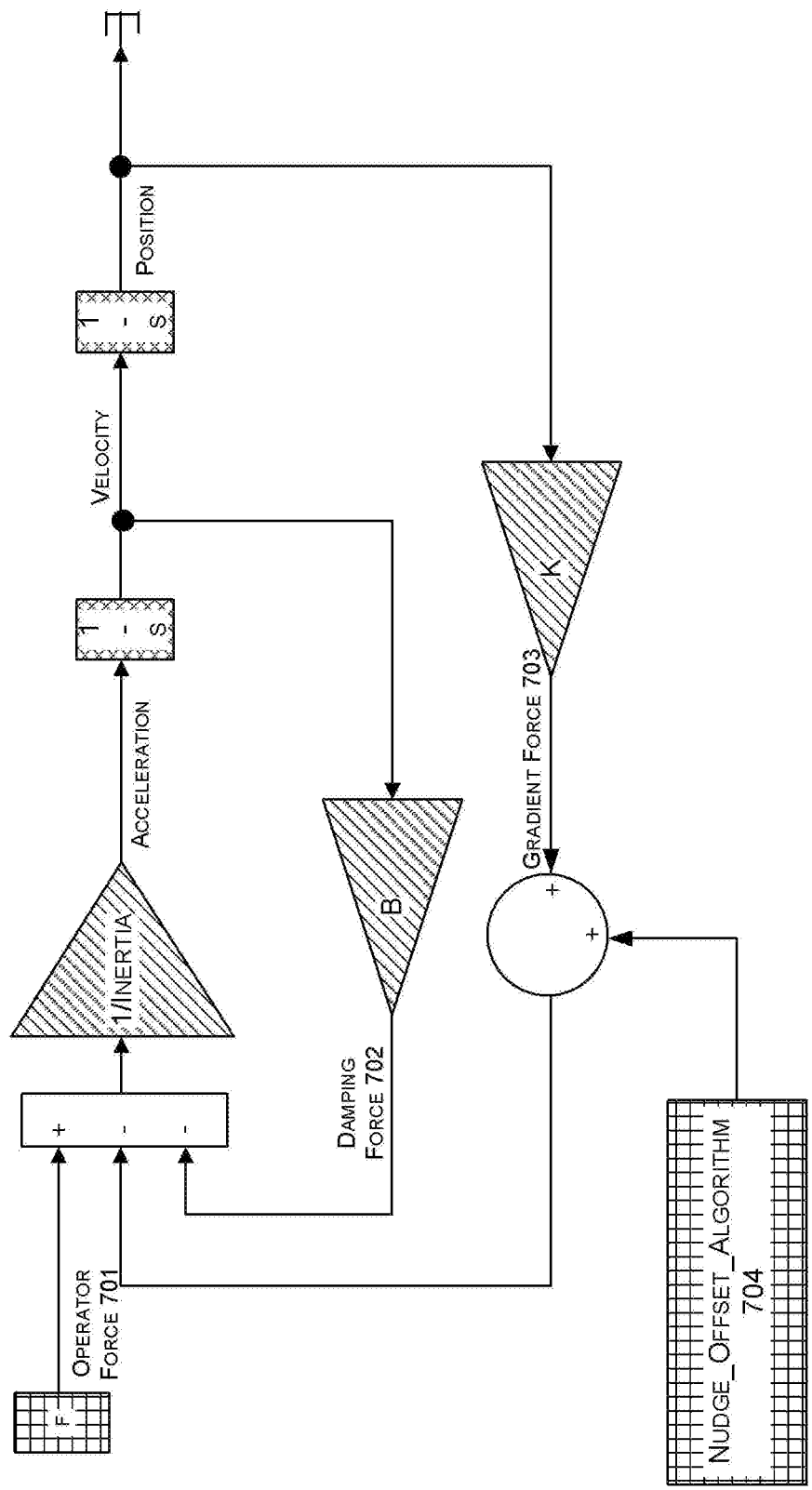
FIG. 7 is a block diagram showing how the generated force offset may be summed with the simulation model "static force".

In some options, the generated force offset of the overall nudge algorithm 704 may be summed with the gradient force simulation (e.g. MSD/feel model) "static force", as shown in FIG. 7. This allows the active inceptor (e.g. active stick) to move to the commanded position. The main parameters in FIG. 7 are the Operator Force 701 (e.g. the pilot force), the Inertia, the Damping force 702, and the gradient force 703 which can be transmitted from the command computer.

Figure 8:
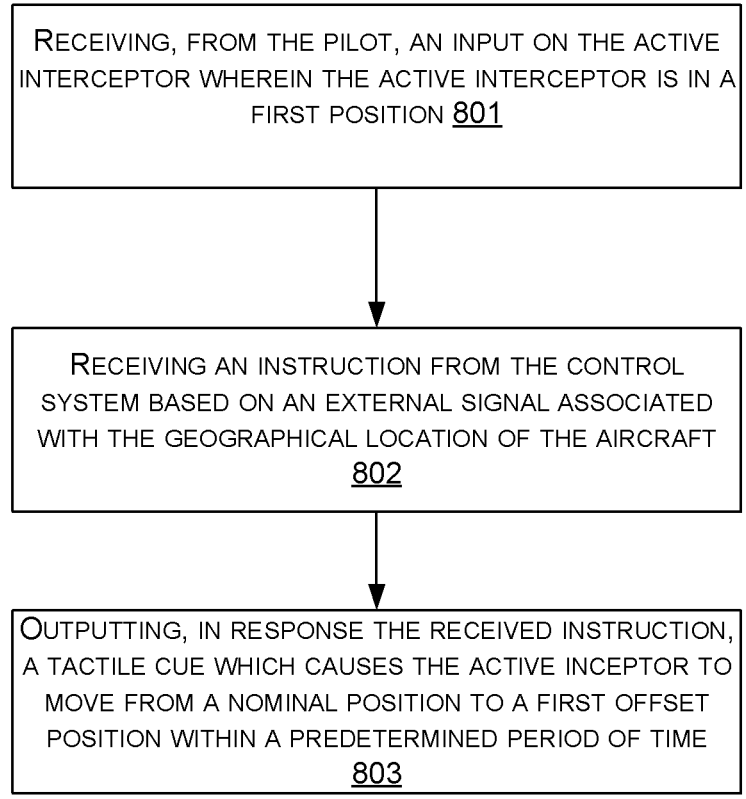
FIG. 8 is a method of controlling a vehicle via an active inceptor system.

FIG. 8 shows a method for assisting a pilot to control an aircraft operating under control of an active inceptor via, for example, a control system. The method comprises, at step 801, receiving, from the pilot, an input on the active inceptor wherein the active inceptor is in a nominal position. The nominal position may be a neutral position in which the input is due to a lack of force in any direction, or it may be a particular position in which the input is due to a force applied in a particular direction to the active inceptor. The method further comprises, at step 802, receiving an instruction from the control system based on an external signal associated with the geographical location of the aircraft, wherein the instruction may be any one of a directional indicator, speed indicator, a throttle indictor, a distance to turn indicator, a traffic indicator or a time indicator. The method further comprises, at step 803, outputting, in response the received instruction, a tactile cue which causes the active inceptor to move from the nominal position to a first offset position within a predetermined period of time. In other words, the tactile cue is a vibration or nudge in a particular direction.

Figure 9:
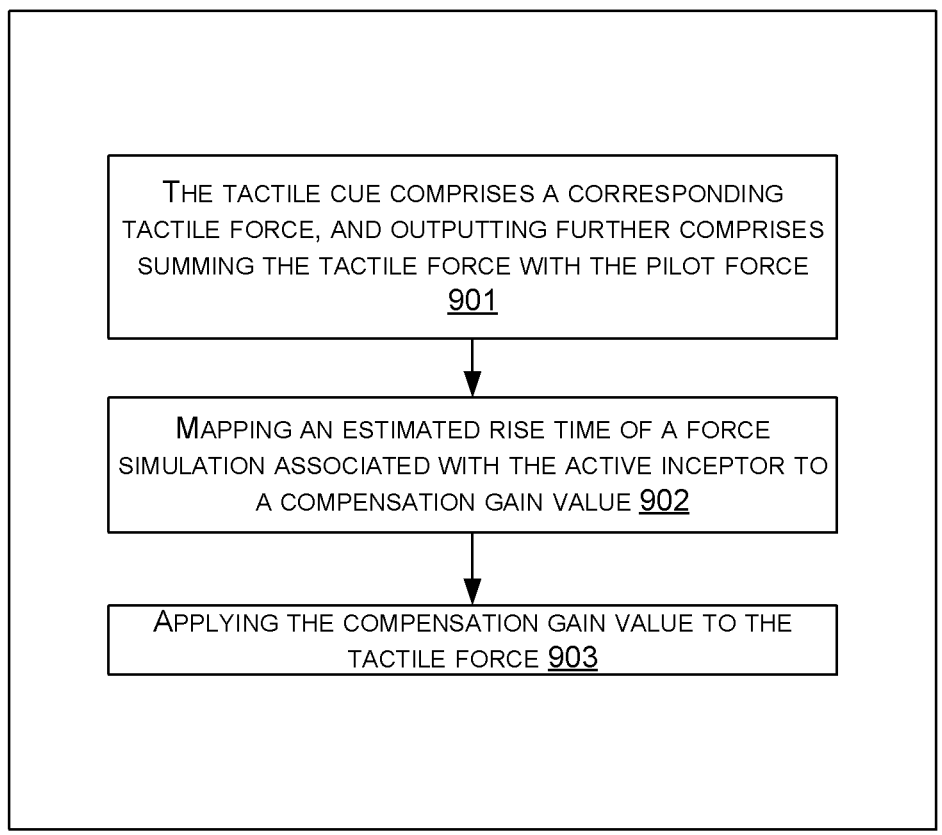
FIG. 9 is an optional feature of the step of outputting in FIG. 8.

In some examples, as shown in FIG. 9, the step of outputting 803 further comprises, in step 901, a corresponding tactile force, and outputting further comprises summing the tactile force with a pilot force. In some options the method further comprises, in step 902-903, mapping an estimated rise time of a force simulation associated with the active inceptor to a compensation gain value, based on a look-up table; and applying the compensation gain value to the tactile force, based on the look-up.

The control system may be configured to receive as inputs at least one of a taxi route, airport map and aircraft parameters (e.g. speed, direction etc). The processor may output instructions to the active inceptor, which in turn may output instructions to a nosewheel steering system (and/or any other aspect of aircraft control that can be controlled by the active inceptor whilst the aircraft is either airborne or on the ground). In some cases, the output instructions may simply be a directional indication to the operator such that the operator can ultimately output the instructions themselves to the nosewheel steering system via the active inceptor. In some options, the active inceptor system is remote to the vehicle, and in other options the active inceptor system forms part of the cockpit of the vehicle (e.g. an aircraft cockpit).

One of the advantages of the above system and methods are that it reduces the burden on the aircraft pilot as they need not take their eyes off the runway in order to look at a display for directions or a map. Another advantage is that the systems and methods of the present invention can be applied to pre-existing active inceptor systems.

Although the description above is in reference to aircraft, it would be clear to the skilled person that the methods and systems may be used in conjunction with any type of vehicle, e.g. motor vehicles, railed vehicles, watercraft, amphibious vehicles and/or spacecraft.

The foregoing description of embodiments of the invention has been presented only for the purpose of illustration and description and is not intended to be exhaustive or to limit the invention to the precise forms disclosed. Numerous modifications and adaptations thereof will be apparent to those skilled in the art without departing from and scope of the present invention.

The invention claimed is:

1. A method for assisting a pilot to control a taxiing aircraft operating under control of an active inceptor via a control system, the method comprising:
receiving, from the pilot, an input on the active inceptor wherein the active inceptor is in a nominal position;
receiving an instruction from the control system based on an external signal associated with a geographical location of the aircraft; and
outputting, in response to the received instruction, a tactile cue in a particular direction the aircraft should be directed based on the geographical location of the aircraft, which causes the active inceptor to move from the nominal position to an offset position within a predetermined period of time, wherein the tactile cue comprises a corresponding tactile force in the particular direction summed with the input on the active inceptor received from the pilot.

2. The method of claim 1, wherein outputting further comprises:
mapping an estimated rise time of a force simulation associated with the active inceptor to a compensation gain value, based on a look-up table and a bandwidth of the control system; and
applying the compensation gain value to the tactile force.

3. The method of claim 2, wherein the force simulation is a mass-spring-damper model.

4. The method of claim 1, wherein the offset position is a first offset position, the method further comprising outputting a subsequent tactile cue which causes the active inceptor to move to a second offset position subsequent to the first offset position.

5. The method of claim 4, wherein the second offset position of the active inceptor is the same as the nominal position of the active inceptor.

6. The method of claim 4, wherein outputting the subsequent tactile cue cannot be delivered until the tactile cue is over.

7. A control system for assisting a pilot to control an aircraft operating under control of an active inceptor, the control system comprising:
a receiver for receiving pilot-inputs on the active inceptor;
an instruction generator to generate an instruction, the instruction based on an external signal associated with the geographical location of the aircraft; and
a tactile cue generator configured to generate a tactile cue in a particular direction the aircraft should be directed based on the geographical location of the aircraft, which causes the active inceptor to move from a nominal position to an offset position in a predetermined time period in response to the instruction,
wherein the tactile cue comprises a corresponding tactile force in the particular direction summed with the input on the active inceptor received from the pilot.

8. The control system of claim 7, wherein the tactile cue generator comprises:
a look-up table comprising an estimated rise time of a force simulator, said look-up table for mapping the estimated rise time to a compensation gain value table and a bandwidth of the control system; and
wherein the compensation gain value is applied to the tactile force.

9. The control system of claim 8, wherein the force simulator is a mass-spring-damper model.

10. The control system of claim 7, wherein the offset position is a first offset position, and wherein the tactile cue generator is configured to generate a subsequent tactile cue which causes the active inceptor to move to a second offset position subsequent to the first offset position.

11. The control system of claim 10, wherein the second offset position of the active inceptor is the same as the nominal position of the active inceptor.

12. The control system of claim 10, wherein the subsequent tactile cue cannot be generated until the tactile cue is generated.

13. The control system of claim 7, said tactile cue generator comprising:
an operator force input system to receive an operator force;
a first integrator to integrate an acceleration associated with operator force resulting in a velocity;
a second integrator to integrate the velocity resulting in a position;
a damping force based on the velocity;
a gradient force based on the position; and
an inertia characteristic, in combination with the damping force and gradient force, used to calculate a position offset when generating the tactile cue, wherein the position offset is the difference between the nominal position and the offset position.

14. The control system of claim 8, comprising:
the force simulator, wherein the force simulator includes a force simulating model that can be changed in real time based on parameters from a flight control computer.

15. The control system of claim 14, wherein the force simulating model is a mass-spring-damper model.

16. The control system of claim 8, wherein the offset position is a first offset position, and wherein the tactile cue generator is configured to generate a subsequent tactile cue which causes the active inceptor to move to a second offset position subsequent to the first offset position.

17. The control system of claim 16, wherein the subsequent tactile cue cannot be generated until the tactile cue is generated.

18. An aircraft comprising a fly-by-wire system and the control system of claim 7 operatively coupled to the fly-by-wire system, wherein the control system is configured to feed back information from the fly-by-wire system to the pilot through the active inceptor.

* * * * *